(12) United States Patent
Tofsland et al.

(10) Patent No.: US 8,951,337 B2
(45) Date of Patent: Feb. 10, 2015

(54) COST-EFFECTIVE TUNABLE PRECLEANER

(75) Inventors: Kenneth M. Tofsland, Stoughton, WI (US); Stephen L. Fallon, Oregon, WI (US)

(73) Assignee: Cummins Filtration IP Inc., Minneapolis, MN (US)

( * ) Notice: Subject to any disclaimer, the term of this patent is extended or adjusted under 35 U.S.C. 154(b) by 262 days.

(21) Appl. No.: 13/278,363

(22) Filed: Oct. 21, 2011

(65) Prior Publication Data

US 2012/0234168 A1    Sep. 20, 2012

Related U.S. Application Data

(60) Provisional application No. 61/452,667, filed on Mar. 15, 2011.

(51) Int. Cl.
    *B01D 45/12* (2006.01)
(52) U.S. Cl.
    USPC ............... 95/269; 55/394; 55/418; 55/419; 55/420; 55/398; 55/401; 55/403; 55/337; 55/456; 55/320; 55/449; 55/321; 123/198 E
(58) Field of Classification Search
    USPC ........... 55/394, 418–420, 457, 398, 401, 403, 55/337, 456, 320, 449, 321; 95/269; 123/198 E
    See application file for complete search history.

(56) References Cited

U.S. PATENT DOCUMENTS

| | | | |
|---|---|---|---|
| 1,302,716 A | | 5/1919 | Sargent |
| 2,322,414 A | | 6/1943 | Bowen |
| 2,661,810 A | | 12/1953 | Heth |
| 3,339,533 A | * | 9/1967 | Nordstrom ................. 123/572 |
| 3,566,586 A | | 3/1971 | Langness |
| 3,590,560 A | | 7/1971 | Pall et al. |
| 4,048,911 A | | 9/1977 | Petersen |
| 4,127,396 A | | 11/1978 | Tortorici et al. |
| 4,159,899 A | | 7/1979 | Deschenes |
| 5,320,653 A | | 6/1994 | Morgan et al. |
| 6,110,246 A | | 8/2000 | Eubank |
| 6,280,493 B1 | | 8/2001 | Eubank |
| 7,258,713 B2 | | 8/2007 | Eubank et al. |
| 7,364,601 B2 | | 4/2008 | Xu et al. |
| 2007/0234903 A1 | | 10/2007 | Xu et al. |

OTHER PUBLICATIONS

DualSpin pre-separator, Mann + Hummel, at least as early as Nov. 3, 2010.

* cited by examiner

*Primary Examiner* — Dung H Bui
(74) *Attorney, Agent, or Firm* — Foley & Lardner LLP

(57) ABSTRACT

An inertial separation air precleaner system includes a replaceable insert removably mounted to the precleaner and altering air flow velocity through the precleaner by changing flow area of the flowpath through the precleaner housing. The replaceable insert is replaceable with a different insert for the same precleaner housing, which different insert provides a different flow area through the precleaner housing, enabling a selectable precleaner efficiency vs. restriction trade-off as chosen by a user for a particular application, enabling tuning of precleaner performance by the user.

18 Claims, 5 Drawing Sheets

COST-EFFECTIVE TUNABLE PRECLEANER

CROSS-REFERENCE TO RELATED APPLICATION

This application claims the benefit of and priority from Provisional U.S. Patent Application No. 61/452,667, filed Mar. 15, 2011, incorporated herein by reference.

BACKGROUND AND SUMMARY

The invention relates to inertial separation precleaners for air filters.

Inertial separation precleaners for air filters are known. Incoming dirty or dust laden air is partially cleaned by the precleaner and then sent downstream to a filter. An inertial separation precleaner imparts centrifugal force on the incoming dirt laden air to effect dirt particle separation. A radial vane precleaner deflects the incoming dirt laden air and mechanically imparts a centrifugal force on it, as is known.

Inertial separation radial vane separators are designed for a limited flow rate range, and there is a trade-off between system efficiency and system restriction within the design flow rate range. If the system is operated at a flow rate above the range, the system restriction can get too high, which can lead to reduced system capacity, which can have consequential deleterious effects, e.g. loss of engine power in engine applications. If the system is operated below the design flow rate range, precleaner efficiency suffers. Typically, the efficiency of the precleaner significantly affects system capacity. Small changes in precleaner efficiency can determine whether capacity targets can be attained.

In the past, because of the noted narrow range of operability, flow rates outside of design limits may require changing the construction design and re-tooling the precleaner. In one alternative, it is known to swap out or change the inlet radial vane structure or inlet distributor, without changing the remaining precleaner housing and constructions. This partially reduces the cost of re-design and/or re-tooling.

The present system arose during continuing development efforts in the above technology. In one embodiment, the present system provides further cost reduction in tuning precleaner performance without re-design and re-tooling, and without requiring replacement of the radial vane structure or inlet distributor. In other aspects, particularly cost-effective tuning methodology is enabled providing differing precleaner efficiency vs. restriction trade-offs for user selection and concordant tunable precleaner performance.

DETAILED DESCRIPTION

Figure 1:
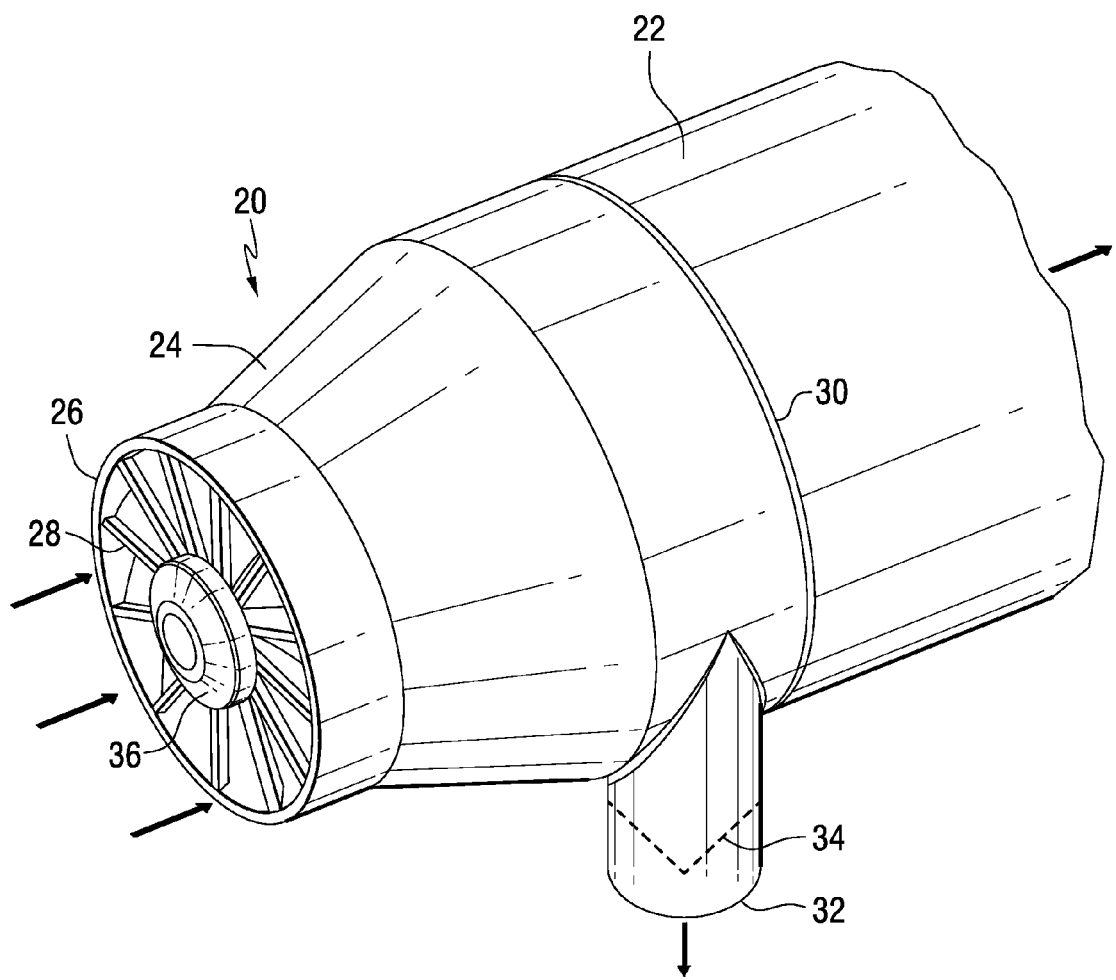
FIG. 1 is an isometric view of an air precleaner in accordance with the disclosure.

FIG. 1 shows an air precleaner 20 for a filter 22 downstream thereof. The precleaner includes a housing 24 having an inlet 26 receiving incoming dirt laden air, vane structure 28 imparting centrifugal force on the air to inertially separate dirt particles therefrom to preclean the air, and an outlet 30 discharging precleaned air, e.g. to downstream filter 22. The precleaner housing has a flowpath therethrough from inlet 26 to outlet 30. A second outlet is provided at 32 for discharging separated contaminant particulate, which outlet 32 may include a one-way valve such as shown in dashed line at 34, all as is known.

A replaceable insert 36 is removably mounted to the precleaner housing and alters air flow velocity through the precleaner housing by changing the flow area of the flowpath through the precleaner housing. As will be described, the replaceable insert is replaceable with a different insert for the same precleaner housing, with the different insert providing a different flow area through the precleaner housing, enabling a selectable precleaner efficiency vs. restriction trade-off as chosen by a user for a particular application, enabling tuning of precleaner performance by the user for the particular application, and in one desirable embodiment, without having to buy another precleaner housing nor having to re-design nor re-tool the combination. In one embodiment, a series of inserts are provided, each being selectable for removable and replaceable mounting to the precleaner housing and providing differing flow areas of the flowpath through the precleaner housing to provide differing precleaner efficiency vs. restriction trade-offs for user selection and concordant tunable precleaner performance.

Figure 2:
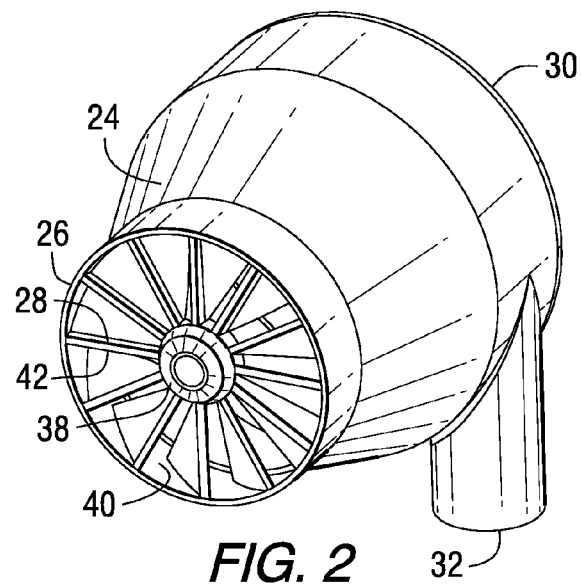
FIG. 2 is an isometric view of a portion of FIG. 1.
Figure 3:
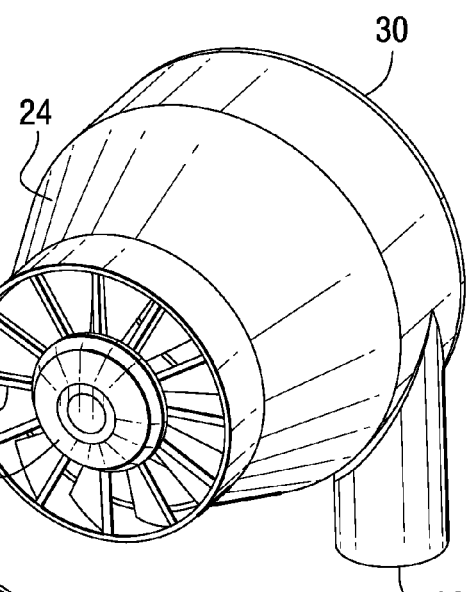
FIG. 3 is like FIG. 2 and shows another embodiment.
Figure 4:
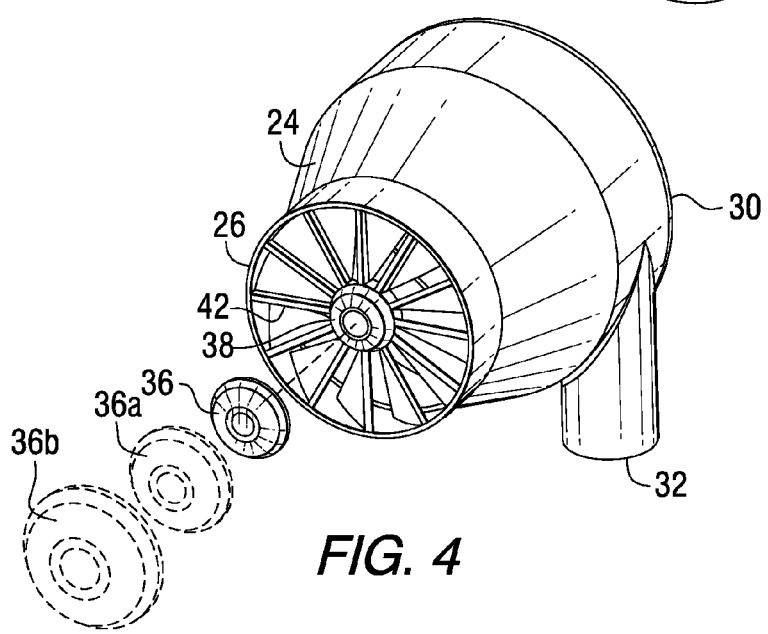
FIG. 4 is an exploded perspective view of the construction of FIG. 3.
Figure 5:
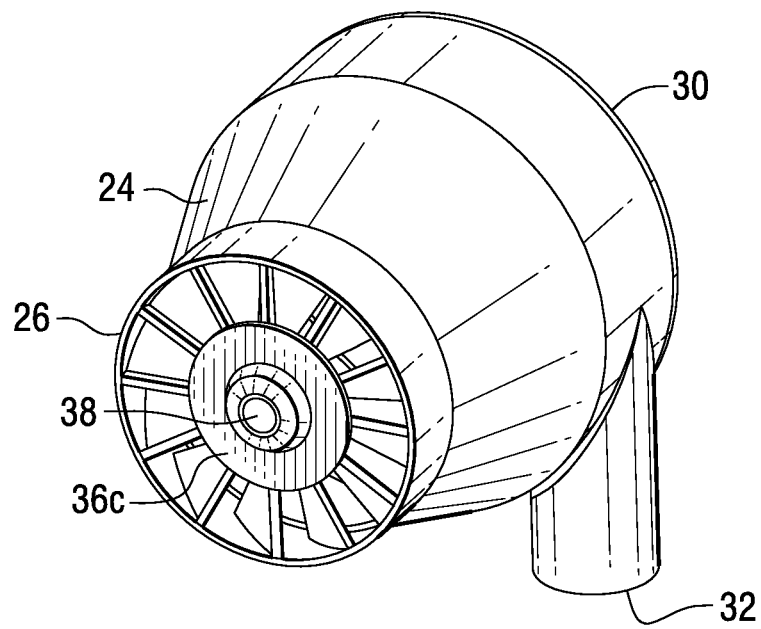
FIG. 5 is like FIG. 3 and shows another embodiment.
Figure 6:
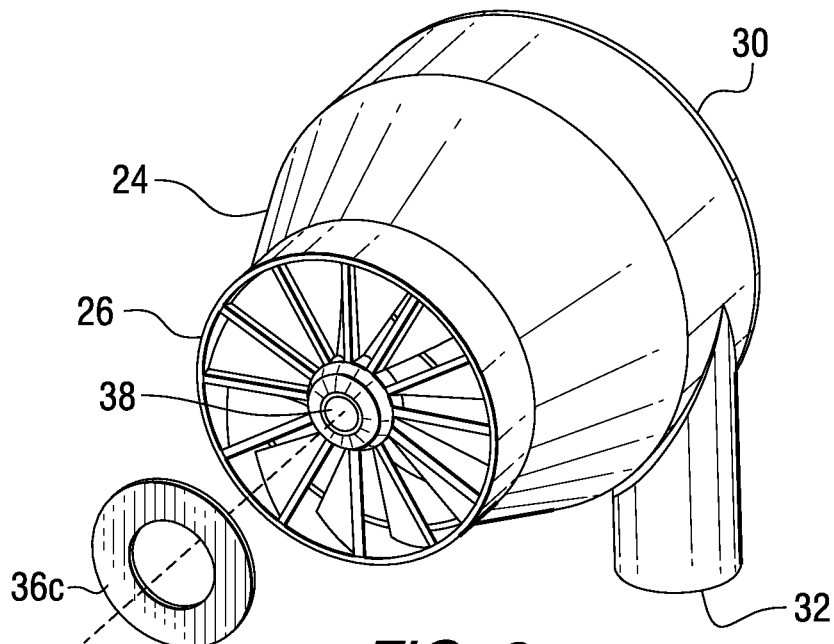
FIG. 6 is an exploded perspective view of the construction of FIG. 5.
Figure 7:
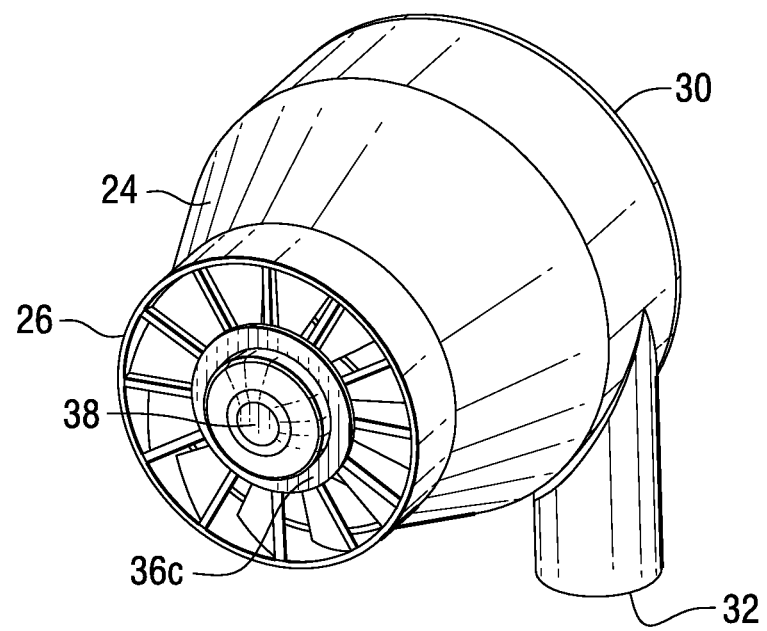
FIG. 7 is like FIG. 3 and shows another embodiment.
Figure 8:
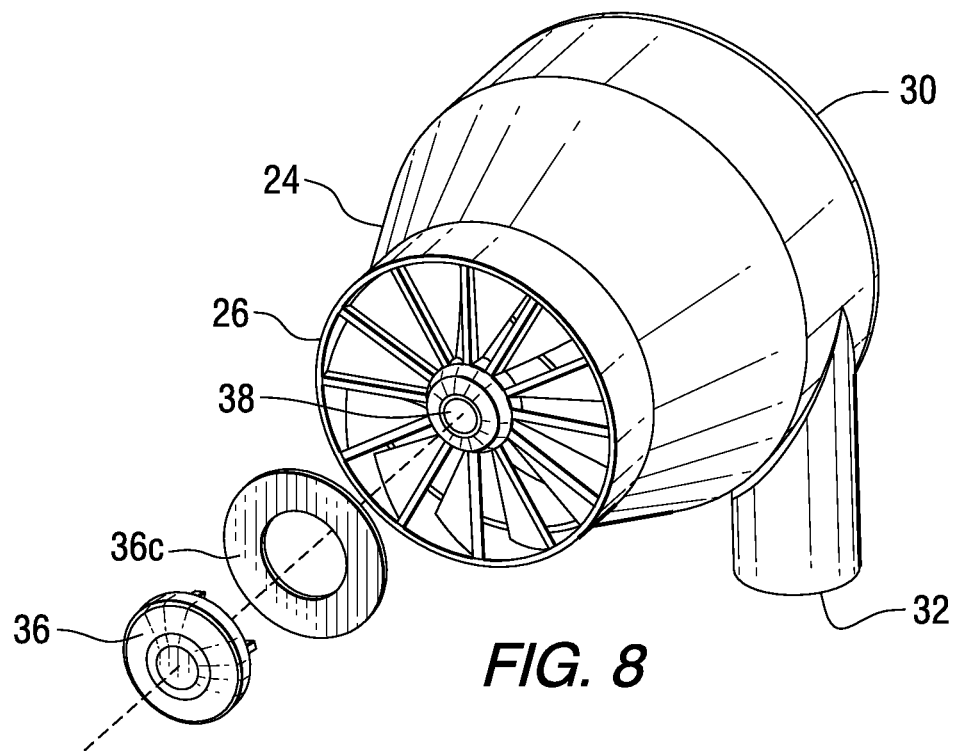
FIG. 8 is an exploded perspective view of the construction of FIG. 7.
Figure 9:
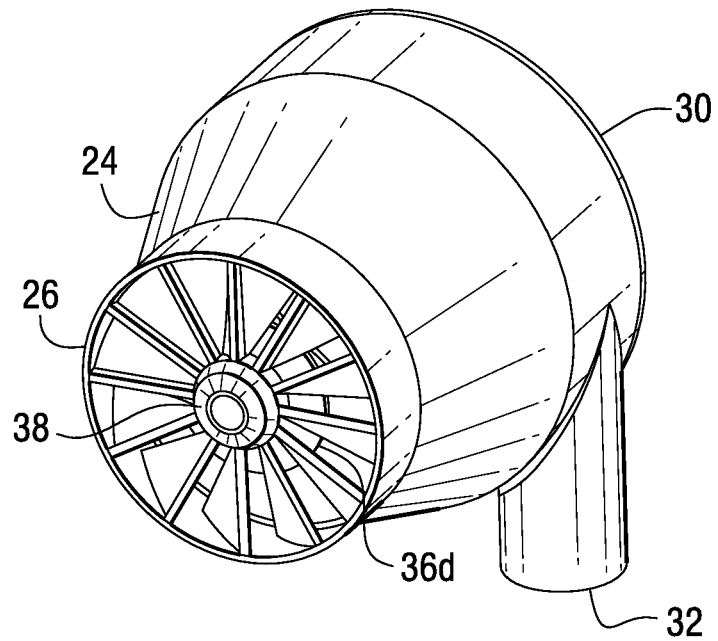
FIG. 9 is like FIG. 3 and shows another embodiment.
Figure 10:
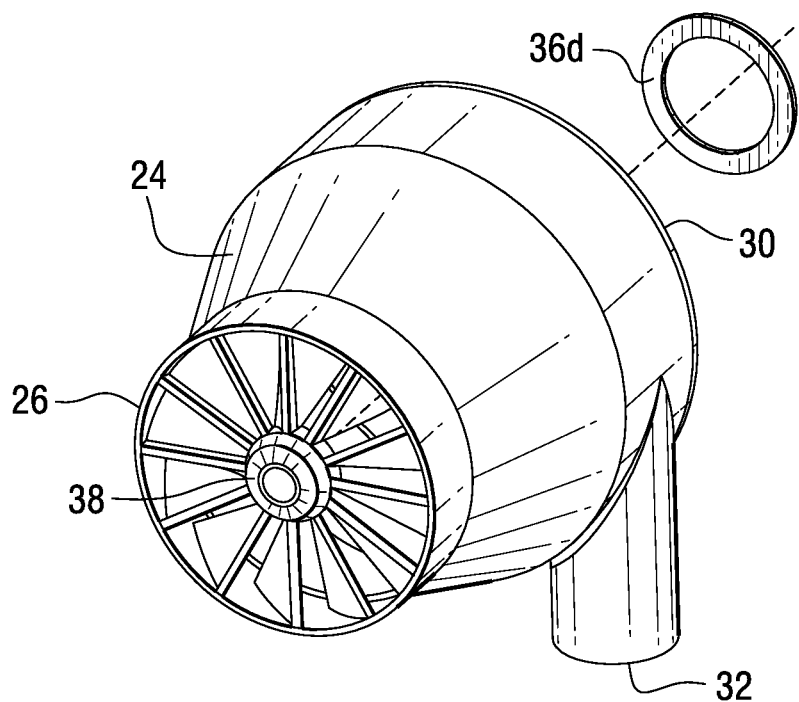
FIG. 10 is an exploded perspective view of the construction of FIG. 9.

Referring to FIGS. 2-4, the base precleaner housing 24 is shown in FIG. 2. Inlet 26 is provided by a circular inlet having a central hub 38 and an outer circumferential sidewall 40. The noted vane structure is provided by a plurality of vanes 42 extending radially outwardly from hub 38 to sidewall 40. The sidewall is spaced radially outwardly of the hub by an annular gap therebetween. The air flowpath flows through such annular gap in an annulus, which annulus has a radial width between an inner circumference and an outer circumference, with the outer circumference circumscribing the inner circumference. The noted insert 36, FIGS. 3, 4, is disposed at inlet 26 and changes the diameter of at least one of the noted inner and outer circumferences to change the noted flow area by changing the noted radial width of the noted annulus. In one embodiment, insert 36 is at hub 38 and increases the diameter of the noted inner circumference of the flowpath annulus, to reduce the noted radial width of the flowpath annulus. In one embodiment, a series of inserts 36, e.g. inserts 36a, 36b, etc., are provided of increasing diameter providing selectively differing reductions of the noted radial width of the noted flowpath annulus. In one embodiment, the insert is provided by a cap as shown at 36 in FIGS. 3, 4. In another embodiment, the insert is provided by a disk as shown at 36c in FIGS. 5, 6, which may or may not also include cap 36, as shown in FIGS. 7, 8. In a further embodiment, the insert may be provided by a ring 36d, FIGS. 9, 10, downstream of the vanes, and which may be provided in combination with any of the above embodiments. In one embodiment, the insert is upstream of the vane structure, FIGS. 3-8. In another embodiment, the insert is downstream of the vane structure, FIGS. 9, 10. The insert is shown at the noted inlet 26. In other embodiments, the insert may be provided at the outlet. In a further embodiment, the insert is a flexible member downstream of the vane structure, e.g. a flexible ring 36d which may flex to vary the noted flow area.

The system provides a method for cost-effectively tuning air precleaner performance for a particular application according to user selection for an air precleaner 20 for a filter 22 downstream thereof. The air precleaner includes a precleaner housing 24 having an inlet 26 receiving incoming dirt laden air, vane structure 28 imparting centrifugal force on the air to inertially separate dirt laden particles therefrom to preclean the air, and an outlet 30 discharging precleaned air to the downstream air filter such as 22. The precleaner housing has a flowpath therethrough from inlet 26 to outlet 30. The method includes providing a replaceable insert 36 removably mounted to the precleaner housing and altering air flow velocity through the precleaner housing by changing flow area of the flowpath through the precleaner housing. The method includes replacing the insert with a different insert for the same precleaner housing, with the different insert providing a different flow area through the precleaner housing, to enable tuning of precleaner performance by the user for the particular application. In one embodiment, this is enabled without having to buy another precleaner housing nor having to re-design nor re-tool the combination. In a further embodiment, a series of inserts are provided, each being selectable for removable and replaceable mounting to the precleaner housing and providing differing flow areas through the precleaner housing to provide differing precleaner efficiency vs. restriction trade-offs for user selection and concordant tunable precleaner performance.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims. Each limitation in the appended claims is intended to invoke interpretation under 35 U.S.C. §112, sixth paragraph, only if the terms "means for" or "step for" are explicitly recited in the respective limitation.

What is claimed is:

1. An air precleaner for a filter downstream thereof, comprising a precleaner housing having an inlet receiving incoming dirt laden air, a vane structure imparting centrifugal force on said air to inertially separate dirt particles therefrom to preclean said air, and an outlet discharging precleaned air, said precleaner housing having a flowpath therethrough from said inlet to said outlet, a replaceable insert removably mounted to said precleaner, wherein said vane structure provides a first flow area for said flow path and said replaceable insert provides a second flow area for said flow path to alter air flow velocity through said precleaner housing, said replaceable insert being a separate member from said vane structure and in series with said vane structure, said replaceable insert being replaceable independently of said vane structure, said replaceable insert being replaceable without replacing said vane structure, wherein said replaceable insert is replaceable with a different insert for the same said precleaner housing, said different insert providing a different flow area through said precleaner housing, enabling a selectable precleaner versus restriction trade-off as chosen by a user for a particular application, enabling tuning of precleaner performance by said user for said particular application, wherein the different flow area, the first flow area and the second flow area are different.

2. The air precleaner according to claim 1, wherein the replaceable insert is removably mounted to a central region of the air precleaner.

3. The air precleaner according to claim 1, wherein the replaceable insert is removably mounted to a central hub of at least one of the inlet and outlet.

4. The air precleaner according to claim 1 wherein said inlet comprises a circular inlet having a central hub and an outer circumferential sidewall, said vane structure comprises a plurality of vanes extending radially outwardly from said hub to said sidewall, said sidewall being radially spaced outwardly of said hub by an annular gap therebetween, said flowpath flowing through said annular gap in an annulus, said annulus having a radial width between an inner circumference and an outer circumference, said outer circumference circumscribing said inner circumference, said replaceable insert being disposed at said inlet and changing the diameter of at least one of said inner and outer circumferences to change said second flow area by changing said radial width of said annulus.

5. The air precleaner according to claim 4 wherein said replaceable insert is at said hub and increases said diameter of said inner circumference to reduce said radial width of said annulus.

6. The air precleaner according to claim 1 comprising a series of said replaceable inserts each being selectable for removable and replaceable mounting to said precleaner housing and providing differing flow areas of said flowpath through said precleaner housing to provide differing precleaner efficiency versus restriction trade-offs for user selection and concordant tunable precleaner performance.

7. The air precleaner according to claim 6 wherein said replaceable insert is selected from at least one of a cap, a disc, and a ring.

8. The air precleaner according to claim 6 wherein said replaceable insert is upstream of said vane structure.

9. The air precleaner according to claim 8 wherein said replaceable insert is at said inlet.

10. An air precleaner for a filter downstream thereof, comprising a precleaner housing having an inlet receiving incoming dirt laden air, vane structure imparting centrifugal force on said air to inertially separate dirt particles therefrom to preclean said air, an outlet discharging precleaned air, said precleaner housing having a flowpath therethrough from said inlet to said outlet, a replaceable insert removably mounted to said precleaner housing and altering air flow velocity through said precleaner housing by changing flow area of said flowpath through said precleaner housing, said replaceable insert being a separate member from said vane structure and in series with said vane structure, said replaceable insert being replaceable independently of said vane structure, said replaceable insert being replaceable without replacing said vane structure, wherein said replaceable insert is replaceable with a different insert for the same said precleaner housing, said different insert providing a different flow area through said precleaner housing, enabling a selectable precleaner versus restriction trade-off as chosen by a user for a particular application, enabling tuning of precleaner performance by said user for said particular application, wherein said inlet comprises a circular inlet having a central hub and an outer circumferential sidewall, said vane structure comprises a plurality of vanes extending radially outwardly from said hub to said sidewall, said sidewall being radially spaced outwardly of said hub by an annular gap therebetween, said flowpath flowing through said annular gap in an annulus, said annulus having a radial width between an inner circumference and an outer circumference, said outer circumference circumscribing said inner circumference, said replaceable insert being disposed at said inlet and changing the diameter of at least one of said inner and outer circumferences to change said flow area by changing said radial width of said annulus, wherein said replaceable insert is at said hub and increases said diameter of said inner circumference to reduce said radial width of said annulus, and a series of said replaceable inserts of increasing diameter providing selectively differing reductions: of said radial width of said annulus, each of said replaceable inserts being selectable for removable and replaceable mounting to said precleaner housing at said inlet at said hub and providing differing flow areas of said flowpath through said precleaner housing to provide differing precleaner efficiency versus restriction trade-offs for user selection and concordant tunable precleaner performance.

11. An air precleaner for a filter downstream thereof, comprising a precleaner housing having an inlet receiving incoming dirt laden air, vane structure imparting centrifugal force on said air to inertially separate dirt particles therefrom to preclean said air, an outlet discharging precleaned air, said precleaner housing having a flowpath therethrough from said inlet to said outlet, a replaceable insert removably mounted to said precleaner housing and altering air flow velocity through said precleaner housing by changing flow area of said flowpath through said precleaner housing, said replaceable insert being a separate member from said vane structure and in series with said vane structure, said replaceable insert being replaceable independently of said vane structure, said replaceable insert being replaceable without replacing said vane structure, wherein said replaceable insert is replaceable with a different insert for the same said precleaner housing, said different insert providing a different flow area through said precleaner housing, enabling a selectable precleaner versus restriction trade-off as chosen by a user for a particular application, enabling tuning of precleaner performance by said user for said particular application, and a series of said replaceable inserts each being selectable for removable and replaceable mounting to said precleaner housing and providing differing flow areas of said flowpath through said precleaner housing to provide differing precleaner efficiency versus restriction trade-offs for user selection and concordant tunable precleaner performance, wherein said replaceable insert is downstream of said vane structure.

12. The air precleaner according to claim 11 wherein said replaceable insert is at said outlet.

13. An air precleaner for a filter downstream thereof, comprising a precleaner housing having an inlet receiving incoming dirt laden air, vane structure imparting centrifugal force on said air to inertially separate dirt particles therefrom to preclean said air, and an outlet discharging precleaned air, said precleaner housing having a flowpath therethrough from said inlet to said outlet, a replaceable insert removably mounted to said precleaner housing and altering air flow velocity through said precleaner housing by changing flow area of said flowpath through said precleaner housing, said replaceable insert being a separate member from said vane structure and in series with said vane structure, said replaceable insert being replaceable independently of said vane structure, said replaceable insert being replaceable without replacing said vane structure, wherein said replaceable insert is replaceable with a different insert for the same said precleaner housing, said different insert providing a different flow area through said precleaner housing, enabling a selectable precleaner versus restriction trade-off as chosen by a user for a particular application, enabling tuning of precleaner performance by said user for said particular application, wherein said replaceable insert is a flexible member downstream of said vane structure.

14. A method for cost-effectively tuning air precleaner performance for a particular application according to user selection for an air precleaner for a filter downstream thereof, said air precleaner comprising a precleaner housing having an inlet receiving incoming dirt laden air, vane structure imparting centrifugal force on said air to inertially separate dirt laden particles therefrom to preclean said air, and an outlet discharging precleaned air, said precleaner housing having a flowpath therethrough from said inlet to said outlet, said method comprising providing a replaceable insert removably mounted to said precleaner housing, altering air flow velocity through said precleaner housing by changing flow area of said flowpath through said precleaner housing, said replaceable insert being a separate member from said vane structure and in series with said vane structure, said replaceable insert being replaceable independently of said vane structure, said replaceable insert being replaceable without replacing said vane structure, and replacing said insert with a different insert for the same said precleaner housing, said different insert providing a different flow area through said precleaner housing, to enable tuning of precleaner performance by said user for said particular application, and comprising selecting precleaner versus restriction trade-off for a particular application according to said enabled tuning.

15. The method according to claim 14 comprising providing a series of said inserts each being selectable for removable and replaceable mounting to said precleaner housing and providing differing flow areas through said precleaner housing to provide differing precleaner efficiency versus restriction trade-offs for user selection and concordant tunable precleaner performance.

16. The method according to claim 14 comprising providing said inlet as a circular inlet having a central hub and an outer circumferential sidewall, providing said vane structure as a plurality of vanes extending radially outwardly from said hub to said sidewall, said sidewall being radially spaced outwardly of said hub by an annular gap therebetween, said flowpath flowing through said annular gap in an annulus, said annulus having a radial width between an inner circumference and an outer circumference, said outer circumference circumscribing said inner circumference, and comprising disposing said insert at said inlet and changing the diameter of at least one of said inner and outer circumferences to change said flow area by changing the radial width of said annulus.

17. The method according to claim 16 comprising disposing said insert at said hub and increasing said diameter of said inner circumference to reduce said radial width of said annulus.

18. The method according to claim 17 comprising providing a series of said inserts of increasing diameter providing selectively differing reductions of said radial width of said annulus.

* * * * *